Oct. 31, 1944. L. W. WOLFE 2,361,807
PROTRACTOR
Filed Dec. 30, 1941 2 Sheets-Sheet 1
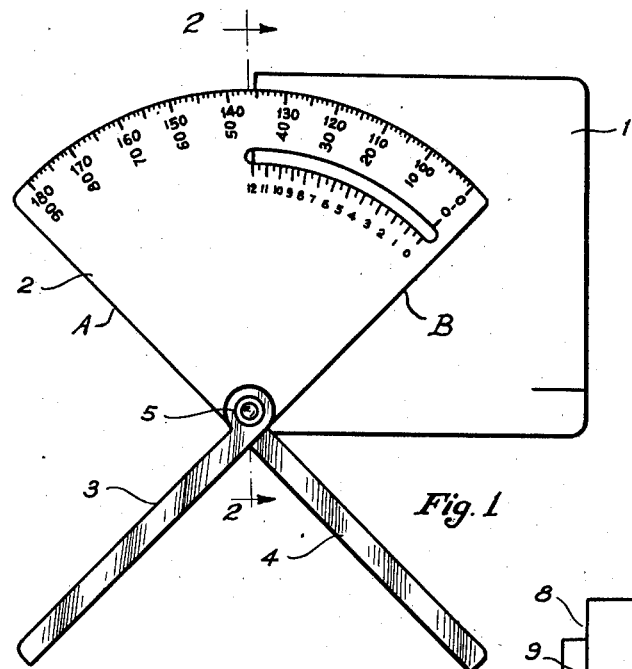
Fig. 1
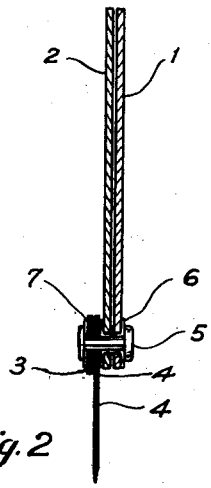
Fig. 2
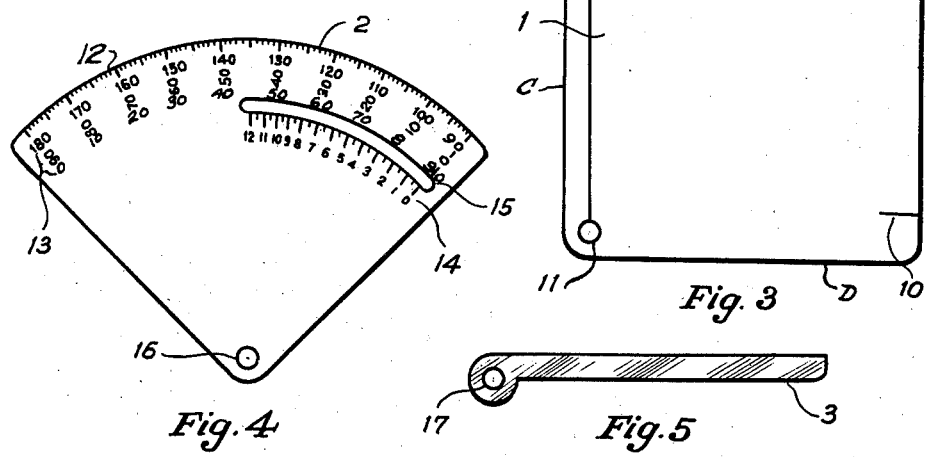
Fig. 3
Fig. 4
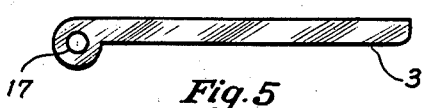
Fig. 5
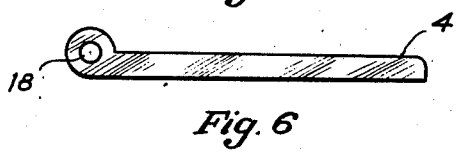
Fig. 6
INVENTOR.
Lem W. Wolfe Oct. 31, 1944.   L. W. WOLFE   2,361,807
PROTRACTOR
Filed Dec. 30, 1941   2 Sheets-Sheet 2

INVENTOR.
Lem W. Wolfe

Patented Oct. 31, 1944

2,361,807

UNITED STATES PATENT OFFICE 2,361,807

PROTRACTOR

Lem W. Wolfe, New York, N. Y.

Application December 30, 1941, Serial No. 424,851

1 Claim. (Cl. 33—75)

This invention relates to a mechanic's protractor which is designed for use by construction men, engineers, foremen, inspectors, mechanics, sheet metal workers, pipe layout men and welders for the purpose of measuring angles in the course of work to obtain readings directly in degrees, as well as readings in inches per foot pitch.

It is a further object of the invention to provide a construction which is rugged and economical and in which angular determinations are facilitated by the provision of two relatively pivoted parts provided with straight edges to assure a setting of the instrument with maximum accuracy.

Other objects and purposes will appear from the more detailed description of the invention following hereinafter, taken in conjunction with the accompanying drawing, wherein Fig. 1 is a plan view of the instrument in accordance with the present invention;

Fig. 2 is a vertical sectional view of the instrument along line 2—2 of Fig. 1;

Fig. 3 is a plan view of one of the principal members of the instrument containing the index lines;

Fig. 4 is a plan view of the other principal member of the instrument containing the scale graduations;

Figs 5 and 6 are plan views of the pivoted blades forming part of the instrument for the purpose of setting angular quantities for determination by reference to the measuring portion of the instrument;

Figure 7:
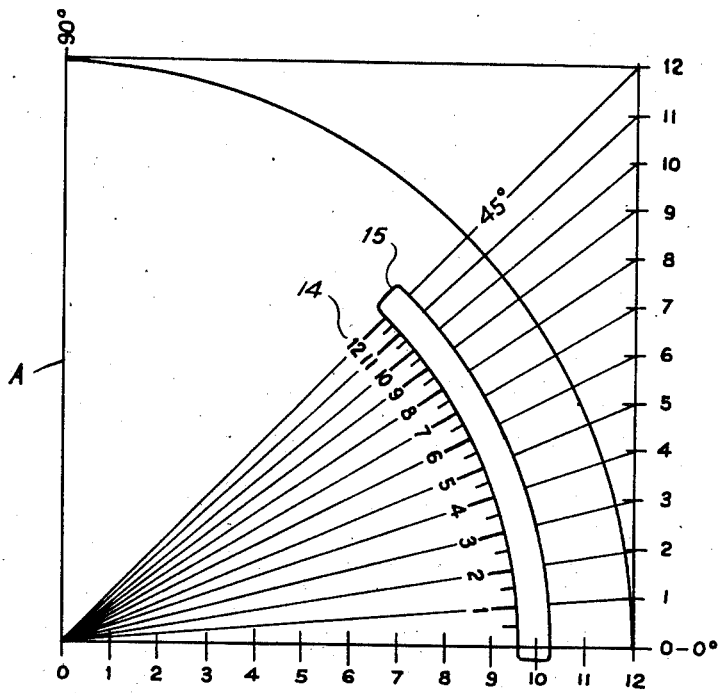
Fig. 7 is a plan view of a portion of the member containing the graduations illustrating the method of laying out the scale of inches per foot upon this member along the arcuate slot thereof.

In Fig. 1 the assembly of the mechanic's protractor is illustrated embodying the sheet-like index member 1 pivotally connected to the sheet-like scale member 2 by a pintle or rivet 5. The members 1 and 2 may be formed of sheet metal or other opaque material. Blades 3 and 4 may be provided in addition for the purpose of setting these blades at predetermined angles for measurement by the members 1 and 2. These blades may be clamped by an eyelet 7 in supplement to an eyelet 6 for the members 1 and 2 cooperating with the rivet 5, which enables the relative rotation of all of the parts by the adjustable movement thereof.

Circular holes 11 in member 1, 16 in member 2, 17 in member 3, and 18 in member 4, are provided for the passage of the eyelets and the rivet therethrough. The centers of holes 11 and 16 constitute the center of the circle of which member 2 forms a sector or quadrant, and the 90° scale which is inscribed on the arcuate boundary 12 of member 2 extends between points within the straight-edges A and B forming the right angle whereat the pivotal mounting 5 is formed. In view of the fact that the holes 11 and 16 are within the boundaries of the quadrant sector, the elements of the arcuate scale are also within the limits of the quadrant and the continued use of the instrument on a job, with a consequent marring of the corners thereof, does not affect the accuracy of the scale, the elements of which are displaced from the respective straight-edges.

Straight-edges C and D are provided on the member 1 which are congruous with straight-edges A and B on member 2 when the members are in superposed relation. However, member 1 extends beyond member 2 in its radial dimensions to facilitate relative movement between the two parts. An index line 9 is formed on member 2 extending from the center of circular aperture 11 to the end of the member extending in parallel to the straight-edge C and a notch 8 may be formed at the extremity to emphasize this index line. This index line runs beyond the arcuate scale 12 and serves to indicate relative movements between members 1 and 2 as the straight-edges A and C, as well as B and D, are moving out of alinement with each other.

A plurality of scales 13 are provided adjacent the arcuate edge 12 to facilitate a reading of the angular values as the straight-edges A and D assume different positions, or as edges A and C are used to take a reading from a bevel which may be used in determining acute interior angles.

In supplement to the scales 12, an arcuate slot 15 is provided therein with the hole 16 as a center, and a scale 14 is inscribed at an edge thereof in inches per foot pitch. The index line 9 is visible through the slot and at predetermined settings of edge D with respect to edge A, it is possible to read the pitch directly having a counterpart value in degrees which is visible on the scales 13. The method of laying out the scale 14 is illustrated in Fig. 7. With a base of 12 inches, representing the reference of one foot, inch values are set off on a vertical line up to 12 inches and where the lines to these points intersect the slot 15, the corresponding inch values are designated. The intermediate values are also indicated as ½ inch so that the index line 9 may determine inch or ½ inch readings per foot pitch. Of course, the scale can be extended in a vertical direction for an additional 12 inches which would correspondingly extend the arcuate slot 15 towards the index line A. It is noted that where the pitch is 12 inches for a base of one foot or 12 inches, the corresponding angle is 45°.

Figure 8:
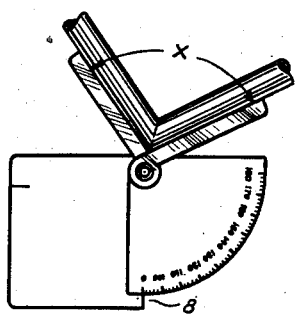
Figs. 8, 9 and 10 shows different positions of the pivoted blades in the course of a manipulation thereof to determine angular quantities by the adjustable setting thereof.
Figure 10:
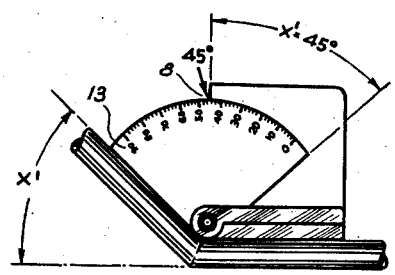
Figure 9:
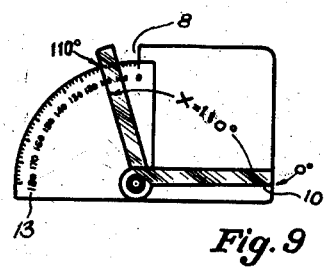

Figs. 8, 9 and 10 show different manipulative steps with the pivoted blades 3 and 4 to fix angular positions therebetween and to measure these angular positions by recourse to the pivoted members 1 and 2. A reference line 10 is provided on Fig. 1 in addition to the index line 9 to fix the setting of these blades thereon as shown in Fig. 8.

While I have described my invention as embodied in specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

A mechanic's protractor comprising a sheet-like opaque member outlining a rectangular sector of a circle having two straight edges extending at right angles to each other and a circular arc bearing an angular scale of 90° extending therebetween with the limits thereof inside said straight edges, a pivot mounting within the corner of said straight edges and forming the apex of a right angle with the limits of the scale on the edge of the circular arc, and a second sheet-like opaque indicating member of larger area than said first member pivotally mounted behind said sector at said pivot mounting, having two straight edges conforming to the edges on said sector when in superposed relation thereto and having the remaining boundary thereof extending beyond the boundary of said first member, an index line on said second member parallel to one of the straight edges thereon in alignment with the pivot mounting and extending beyond the arcuate scale on said first member to form an indicator of the angular reading when said members are pivoted relative to each other, an arcuate opening on said sector within said angular scale, indicia at said opening cooperating with said index line on said second member to indicate inch values per foot pitch as the complementary edges of said members assume different positions relative to each other.

LEM W. WOLFE.